United States Patent
Abali et al.

(10) Patent No.: US 11,573,896 B2
(45) Date of Patent: Feb. 7, 2023

(54) DRAM CACHING STORAGE CLASS MEMORY

(71) Applicant: International Business Machines Corporation, Armonk, NY (US)

(72) Inventors: Bulent Abali, Tenafly, NJ (US); Bartholomew Blaner, Shelburne, VT (US); Alper Buyuktosunoglu, White Plains, NY (US); William J. Starke, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1 day.

(21) Appl. No.: 17/358,216

(22) Filed: Jun. 25, 2021

(65) Prior Publication Data

US 2022/0414007 A1  Dec. 29, 2022

(51) Int. Cl.
*G06F 12/00* (2006.01)
*G06F 12/0802* (2016.01)
*G06F 12/06* (2006.01)

(52) U.S. Cl.
CPC ...... *G06F 12/0802* (2013.01); *G06F 12/0638* (2013.01); *G06F 2212/72* (2013.01)

(58) Field of Classification Search
CPC ............. G06F 12/0802; G06F 12/0638; G06F 2212/72
See application file for complete search history.

(56) References Cited

U.S. PATENT DOCUMENTS

| | | | |
|---|---|---|---|
| 10,176,099 B2 | 1/2019 | Gaur et al. | |
| 10,579,535 B2 | 3/2020 | Rappoport et al. | |
| 10,838,722 B2 | 11/2020 | Gerzon et al. | |
| 2017/0123977 A1* | 5/2017 | Krishnamurthy | G06F 3/0608 |
| 2021/0165580 A1* | 6/2021 | Abali | G06F 12/0895 |

OTHER PUBLICATIONS

Hsu et al., "Performance of Cache DRAM Organization in Vector Supercomputers", 1993 IEEE, 11 pages. Proceedings of the 20th annual international symposium on computer architecture, May 1993.
Chong, "Caching", Harvard, School of Engineering and Applied Sciences, CS61, Lecture 13, Oct. 2011, 57 pages.
"Method for Efficient Access in Hybrid Memory Systems", ip.com, IP.com No. IPCOM000243872D, IP.com Electronic Publication Date: Oct. 23, 2015, 5 pages.

(Continued)

*Primary Examiner* — Shawn X Gu
(74) *Attorney, Agent, or Firm* — Stosch Sabo (57) ABSTRACT

A method, system, and computer program product for local DRAM caching of storage class memory elements are provided. The method identifies a cache line with a cache address in a local dynamic random-access memory (DRAM). The cache line is compressed within the local DRAM to generate a compressed cache line and an open memory space within the local DRAM. A cache tag is generated in the open memory space and a validation value is generated in the open memory space for the compressed cache line. The method determines a cache-hit for the cache line based on the cache address, the cache tag, and the validation value.

17 Claims, 6 Drawing Sheets

(56) References Cited

OTHER PUBLICATIONS

"Cache Memory Power Reduction Through Valid Bit Detection", ip.com, IP.com No. IPCOM000209079D, IP.com Electronic Publication Date: Jul. 26, 2011, 7 pages.
"Method to prolong the life of a Multi-Level Cell Flash Disk Cache", ip.com, IP.com No. IPCOM000200055D, IP.com Electronic Publication Date: Sep. 24, 2010, 6 pages.
Mell et al., "The NIST Definition of Cloud Computing", Recommendations of the National Institute of Standards and Technology, Special Publication 800-145, Sep. 2011, 7 pages.

* cited by examiner

DRAM CACHING STORAGE CLASS MEMORY

BACKGROUND

Processor performance and memory performance have increased at differing rates. Increased processor performance and memory capacity increases additional virtual machines and virtualized containers. Some mechanisms for memory include slower access times, thus memory capacity for a computing system is often balanced between quick access volatile memory and slower access persistent storage. Some existing systems use storage class or persistent memory in combination with dynamic random-access memory (DRAM). Some of these systems use memory buffers and memory interfaces corresponding the storage class memory and DRAM. Some systems with storage class memory and varying speeds of DRAM may use memory buffers corresponding to the varying speeds of DRAM in attempt to overcome slower speeds of some included DRAM. Some systems use local DRAM and remote DRAM communicatively connected to differing processors, called Memory-Inception.

SUMMARY

According to an embodiment described herein, a computer-implemented method for local DRAM caching of storage class memory elements is provided. The method identifies a cache line with a cache address in a local dynamic random-access memory (DRAM). The cache line is compressed within the local DRAM to generate a compressed cache line and an open memory space within the cache line. A cache tag is generated in the open memory space and a validation value is generated in the open memory space for the compressed cache line. The method determines a cache-hit for the cache line based on the cache address, the cache tag, and the validation value.

According to an embodiment described herein, a system for local DRAM caching of storage class memory elements is provided. The system includes one or more processors and a computer-readable storage medium, coupled to the one or more processors, storing program instructions that, when executed by the one or more processors, cause the one or more processors to perform operations. The operations identify a cache line with a cache address in a local dynamic random-access memory (DRAM). The cache line is compressed within the local DRAM to generate a compressed cache line and an open memory space within the local DRAM. A cache tag is generated in the open memory space and a validation value is generated in the open memory space for the compressed cache line. The operations determine a cache-hit for the cache line based on the cache address, the cache tag, and the validation value.

According to an embodiment described herein, a computer program product for local DRAM caching of storage class memory elements is provided. The computer program product includes a computer-readable storage medium having program instructions embodied therewith, the program instructions being executable by one or more processors to cause the one or more processors to identify a cache line with a cache address in a local dynamic random-access memory (DRAM). The cache line is compressed within the local DRAM to generate a compressed cache line and an open memory space within the local DRAM. A cache tag is generated in the open memory space and a validation value is generated in the open memory space for the compressed cache line. The computer program product determines a cache-hit for the cache line based on the cache address, the cache tag, and the validation value.

DETAILED DESCRIPTION

The present disclosure relates generally to methods for local caching. More particularly, but not exclusively, embodiments of the present disclosure relate to a computer-implemented method for local DRAM caching of storage class memory elements. The present disclosure relates further to a related system for local caching, and a computer program product for operating such a system.

Processor performance and memory performance have increased at differing rates. Increased processor performance and memory capacity increases additional virtual machines and virtualized containers. However, memory capacity often provides a limitation on function and performance of virtual machines and virtualized containers. Storage class memory and other multi-level memory constructs, such as Memory-Inception, are emerging as alternatives to local DRAM. Multi-level memory constructs operate as an attempt to increase memory capacity logically. However, these multi-level memory constructs provide lesser performance when compared to DRAM memory modules. Some current systems use a cache directory and a fast tag array on a static random-access memory (SRAM) to implement a cache. Such systems are incompatible with large DRAM-based caches because SRAM capacities are not large enough to contain a directory for such large caches. Some systems use L3 cache compression and encode a full-tag in the cache line and a hashed-tag in a fast-tag array. Such systems present difficulties in scaling and feasibility for a large DRAM-based cache due to the separate tag array. Thus, there would be a benefit to augmenting emerging memory solutions with local DRAM memory modules.

Embodiments of the present disclosure augment memory solutions with local DRAM-based caching. Some embodiments of the present disclosure provide a mechanism to construct caches using local DRAM. In such embodiments, a constructed cache may be larger without increasing investments in processor nest logic. These embodiments may combine capacity benefits of emerging memory technology and increased speed of DRAM memory modules. Embodiments of the present disclosure enables scalable DRAM-based caching, providing average latency similar to that of local memory. Some embodiments of the present disclosure enable generation of cache directory elements, tags, or control bits to be encoded within cache line data using compression. In some embodiments, compression of cache line data is performed using light compression. Embodiments of the present disclosure present a cache without a separate directory by enabling tags to be encoded with the cache line data. Some embodiments of the present disclosure use DRAM as a cache of slower DRAM, storage class memory (SCM), or Memory-Inception like two level memory structures. In such instances, cache compression may be used as a tool to enable local DRAM as a cache of SCM. In some embodiments, the present disclosure enables a cache using quadword sectors such as POWER. Such embodiments for sectored cache lines use tag replication in the quadwords. In some embodiments using quadwords, the present disclosure delivers a critical quadword first, in the DRAM cache, to the read requestor. In some embodiments, the present disclosure seamlessly addresses cache coherency support for local DRAM as a cache of slower DRAM or SCM.

Some embodiments of the concepts described herein may take the form of a system or a computer program product. For example, a computer program product may store program instructions that, when executed by one or more processors of a computing system, cause the computing system to perform operations described above with respect to the computer-implemented method. By way of further example, the system may comprise components, such as processors and computer-readable storage media. The computer-readable storage media may interact with other components of the system to cause the system to execute program instructions comprising operations of the computer-implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Figure 1:
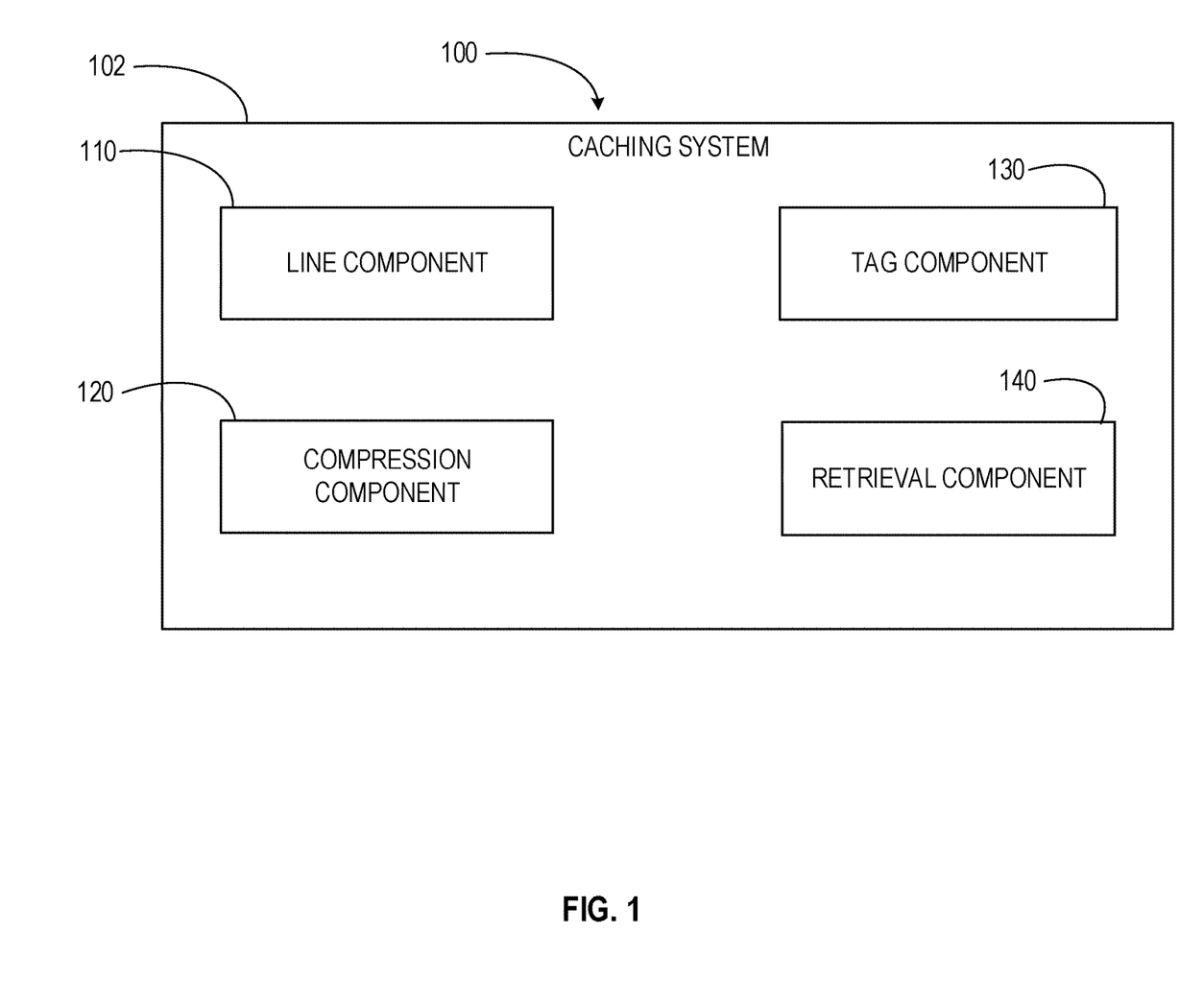
FIG. 1 depicts a block diagram of a computing environment for implementing concepts and computer-based methods, according to at least one embodiment.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include a caching system 102. The caching system 102 may comprise a line component 110, a compression component 120, a tag component 130, and a retrieval component 140. The line component 110 identifies cache lines within DRAM memory modules. The compression component 120 determines compressibility of cache lines and compresses cache lines which are capable of being compressed. The tag component 130 generates cache tags and validation values for cache lines. The retrieval component 140 determines cache-hits, retrieves cache lines subject to cache-hits, and stores cache lines in storage class memory or backing memory. Although described with distinct components, it should be understood that, in at least some embodiments, components may be combined or divided, and/or additional components may be added without departing from the scope of the present disclosure.

Figure 2:
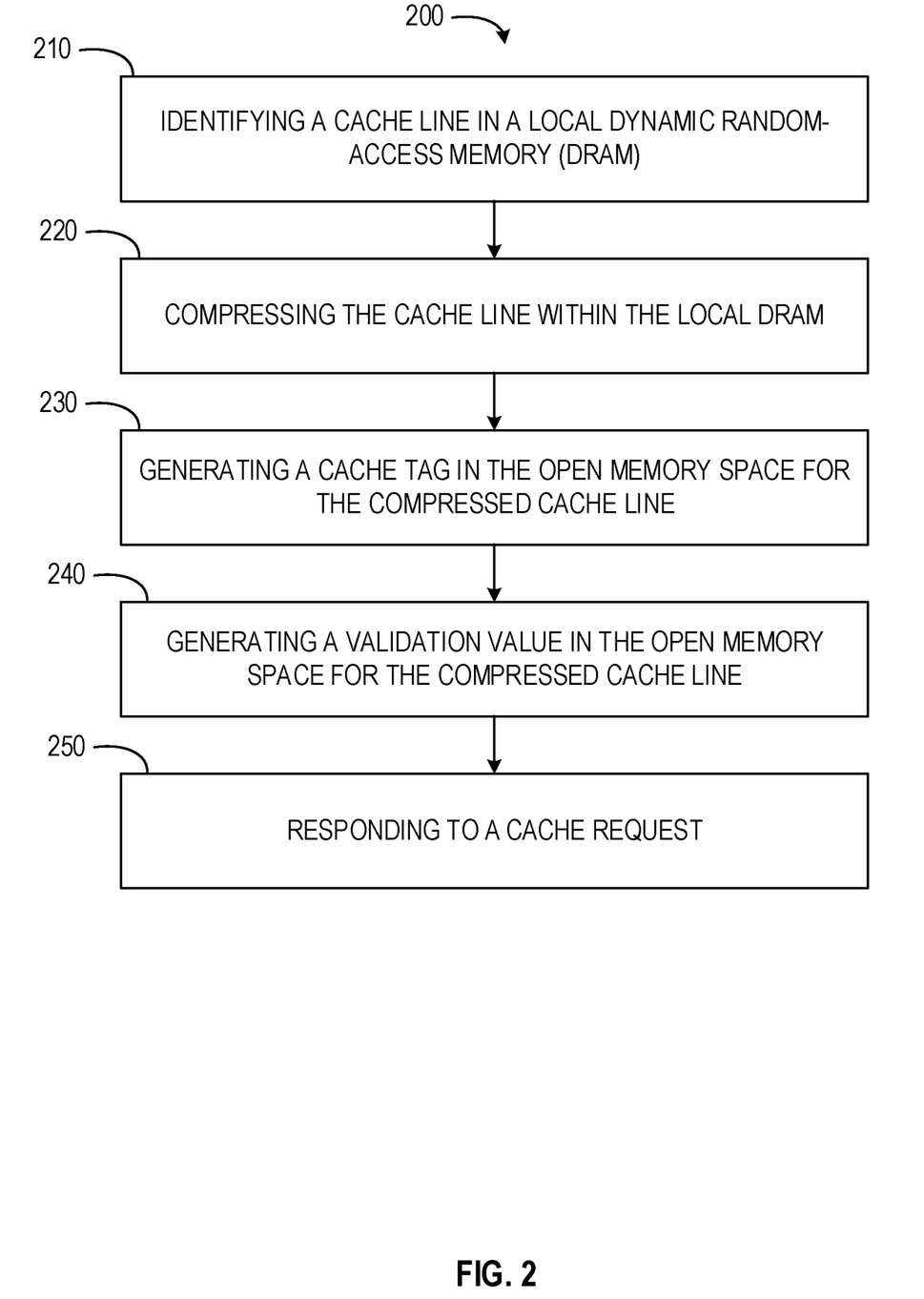
FIG. 2 depicts a flow diagram of a computer-implemented method for local DRAM caching of storage class memory elements, according to at least one embodiment.

Referring now to FIG. 2, a flow diagram of a computer-implemented method 200 is shown. The computer-implemented method 200 is a method for local DRAM caching of storage class memory elements. In some embodiments, the computer-implemented method 200 may be performed by one or more components of the computing environment 100, as described in more detail below.

At operation 210, the line component 110 identifies a cache line. The cache line has a cache address in local dynamic random-access memory (DRAM) (e.g., a DRAM cache). The DRAM cache or local DRAM may be a first memory type associated with or accessible to one or more processors of a computing system. In some embodiments, the local DRAM is a cache of non-uniform memory access (NUMA) DRAM, storage class memory (SCM), or a set of DRAM having variable speeds. The NUMA DRAM, SCM, variable speed DRAM, a backing storage, and secondary storage may be a second memory type associated with or accessible to the one or more processors of a computing system. The logic discussed below with respect to operations 220-250 may be used for all the different variations of possible caches, memory components, or memory modules making up the local DRAM. In some embodiments, the DRAM cache is a one terabyte or greater cache. Backing storage, secondary storage, or other memory component may be sixty-four terabytes or more. In some instances, local address space of one or more processors of a computer system are divided into a first region and a second region. The first memory type (e.g., the DRAM cache) may be mapped to the first region. The second memory type (e.g., the SCM or backing storage) may be mapped to the second region.

At operation 220, the compression component 120 compresses the cache line within the local DRAM. In some instances, the compression component 120 is a zero-value compressor which compresses by using a special encoding for zero valued data items such as bytes or words. Zero is a most frequent data pattern in most memory systems. The compression component 120 may lightly compress the cache line. Compressing the cache line generates a compressed cache line. The light compression may compress address information and cache line data of a cache line together within the local DRAM. In some embodiments, compression of the cache line generated an open memory space within the local DRAM. Light compression of the cache line may create the open memory space as a one byte open space. In such instances the cache line may initially be a 128-byte cache line, and be lightly compressed to be a 127-byte compressed cache line. In some embodiments, the open memory space is contiguous with the compressed cache line within the local DRAM. The compressed cache line or encoded cache line may pass transparently through the processor nest or other memory architecture which simplifies implementation of the present disclosure.

In some embodiments, the cache line is a set of cache lines. The set of cache lines may be stored within the local DRAM. In such instances, the compression component 120, to compress the set of cache lines, determines a compressibility of each cache line of the set of cache lines.

The compression component 120 may determine a first subset of cache lines of the set of cache lines is compressible. In such instances, the compression component 120 compresses each line of the first subset of cache lines within the local DRAM (e.g., the first region of the local address space of a processor). By compressing each cache line of the first subset of cache lines, the compression component 120 generates a set of compressed cache lines and a set of open memory spaces.

The compression component 120 may determine a second subset of cache lines of the set of cache lines is uncompressible. In such instances, the compression component 120 passes an indication of the second subset of cache lines to the retrieval component 140 and the tag component 130. The retrieval component 140 may store the second subset of cache lines in a backing memory, the backing memory being one of remote DRAM, or an SCM, or Memory-Inception.

At operation 230, the tag component 130 generates a cache tag in the open memory space for the compressed cache line. The tag may be a one byte tag or a tag configured to be stored in a one byte space freed through compression of the cache line. Although stated with respect to a specified size or amount of space, it should be understood that the tag may be any suitable size sufficient to be stored in the open memory space. In some instances, the tag is a cache tag of $\log_2$ (SCMsize/DRAMsize) bits. In such instances the logarithm is in a base of 2. For example, for a one terabyte DRAM and a sixty-four terabyte SCM, the tag will be six bits since $\log_2(64)$ is six bits.

In embodiments where the compressed cache line is one of the set of compressed cache lines, the tag component 130 generates a distinct cache tag for each compressed cache line of the set of compressed cache lines. In some embodiments, metadata may be generated and stored next to the cache tag, in the same open space created by compression. The metadata may include a physical address of the cache line at a remote memory. The metadata may also include security keys, replacement information, prefetch status, combinations thereof, or any other suitable information enabling retrieval of data relating to the cache line.

At operation 240, the tag component 130 generates a validation value in the open memory space for the compressed cache line. The validation value may be a single bit. In some embodiments, the validation value indicates whether the cache line is held within the DRAM cache or within the SCM or backing memory.

In embodiments where validation values are generated for the set of compressed cache lines, the tag component 130 generates a validation value for each compressed cache line of the set of compressed cache lines. In some embodiments, the validation value generated for each compressed cache line of the set of compressed cache lines (e.g., the first subset of cache lines) may be a first validation value. The first validation value may indicate presence of the compressed cache line and a cache tag within the local DRAM. In such instances, the validation value may be generated as a one, a constant value, or any other suitable value.

In embodiments where the second subset of cache lines have been determined to be uncompressible and therefore stored in the backing memory, the tag component 130 generates a second validation value for each cache line of the second subset of cache lines. In some instances, while the uncompressible second subset of cache lines are stored in the second region of local address space, a validation value, indicating the cache line is invalid may be stored in the first region to indicate that the respective cache line is stored in the second region. The second validation value may be stored in the local DRAM. The second validation value may be generated as a zero, a constant value distinct from the first validation value, or any other suitable value. Validation of value of zero indicates that the local DRAM does not contain a cache line and that the line is stored in the backing memory.

In some embodiments where the second subset of cache lines have been determined to be uncompressible and stored in the backing memory (e.g., the second region of local address space of a processor), the tag component 130 generates a fixed tag bit-pattern or a fixed data pattern within the local DRAM.

In some embodiments, the operations 210-240 generate a direct mapped cache. The cache size may be increased to an extent of DRAM capacity. In some instances, the cache size may be increased to the extent of DRAM capacity to overcome lack of associativity within the DRAM cache. In some embodiments, the cache may be known by an address originator and a cache controller/decoder south of L2. The line component 110, compression component 120, and the tag component 130 may be part of or interact with the cache controller/decoder. The retrieval component 140 may cooperate with the address originator and the cache controller/decoder to identify, access, and retrieve cache lines.

At operation 250, the retrieval component 140 responds to a cache request. The cache request may be a cache read or a cache write. The cache read operation may determine a presence of a cache or cache line. Determining the presence of the cache or cache line may determine whether a cache-hit or a cache-miss occurs for the cache line. The cache write may compress the cache line, and store the tag and validation value within free space created by compressing the cache line. When the sector cannot be compressed, the cache write operation may generate the validation value of zero in the free or open space and write the cache line to next level memory instead of the DRAM cache.

In some embodiments, the retrieval component 140 determines a cache-hit for the cache line. The cache-hit may be determined based on the cache address, the cache tag, and the validation value. The retrieval component 140 may use a cache controller or act as part of a cache controller to retrieve the cache line from the local DRAM when a cache-hit is determined.

In some embodiments, the retrieval component 140 determines a cache-miss for the cache line. In such instances, the cache line may be stored in the backing memory based on the cache line being uncompressible. The retrieval component 140 may determine the cache-miss based on the second validation value being set at zero within the local DRAM, indicating the cache line has been stored in the backing memory and is not present within the local DRAM.

In some embodiments, the retrieval component 140 determines the cache-miss for the cache line based on a fixed tag bit-pattern or a fixed data pattern. When the pattern is present, the cache contents may be considered invalid and cause the retrieval component 140 to return a cache-miss. In some embodiments, the retrieval component 140 uses a cache controller or acts as a part of a cache controller. When a cache-miss occurs, the retrieval component 140 uses Memory-Inception, passing instructions through one or more processors to retrieve the cache line from a non-local DRAM, a SCM, a backing memory, or other memory component or module other than the local DRAM. In some embodiments, the retrieval component 140 accesses the SCM, backing memory, slow DRAM, or other memory component or module to retrieve the cache line which was subject to the cache-miss in local DRAM. In such instances, the retrieval component 140 accesses the memory component or module directly through one or more processors communicatively coupled to both the local DRAM and the memory component or module.

In some embodiments, a DRAM cache controller on a processor chip, south of L2 coordinates at least a portion of the operations in the method 200. The DRAM cache controller may perform the above-referenced operations without a directory. Similarly, the operations of the method 200 may be performed without on-chip or off-chip arrays. The DRAM cache controller may be a simple and hardware efficient cache controller. The DRAM cache controller may use part of local DRAM as a cache of SCM and inception clustered memory.

In some embodiments, where remote memory, SCM, or backing memory are non-contiguous or page-based, remote addresses of data may be mapped to cache addresses within the local DRAM cache. In such instances, the DRAM cache controller may access the DRAM cache, while other functions may be precluded from doing so. For example, where a set of data is mapped from remote memory to a portion of local DRAM at address CSSSSSS, the 0SSSSSS may be SCM backing storage mapped into a thread of page table entry (PTE) from the remote address and 1000000 is within the DRAM cache. The information in the DRAM cache may not be mapped into the thread of PTE remote address. The PowerBus coherence may operate on 0SSSSSS forms of addresses while 1000000 addresses are not cached. Reads and pushes to 1000000 may be directed to remote memory.

In some instances, the DRAM cache may have cache lines installed from a function or component from L3 cache write. The DRAM cache and backing storage may both be updated with the cache line. In return the DRAM cache controller, cooperating with one or more components of the caching system 102, compresses the cache line and pushes to an address (e.g., 1000000) with a cache tag (e.g., Tag=SSSSSS). The raw cache line may be pushed to an address in backing storage at an address (e.g., 0SSSSSS). Where the line originally came from the DRAM cache, the cache line may be compressed and pushed to an address with a cache tag with a bit not set by the L3 cache write. The bit may be architected in L2 and set to one if the line came from the DRAM cache. If the line did not originate in the DRAM cache, the bit may be reset to zero. Where conflicting cache writes occur, a last cache write may win or overwrite the previous cache write.

In some examples, the retrieval component 140 responds to a cache read request by attempting to read cache lines. If the retrieval component 140 finds a cache-miss, the retrieval component 140 may issue a read to 0SSSSSS, the backing storage. If clean and with no intervention, the retrieval component 140 may substitute 1000000 in the remote address and read the cache line from the DRAM cache. The retrieval component 140 may launch the cache read from the DRAM cache early to reduce latency. Where an intervention or cache miss occurs while attempting to read from the DRAM cache, the data may be discarded. The retrieval component 140 may examine the tag in a returned cache line upon a read from the DRAM cache. Where the tag is an appropriate cache tag and the validation value is deemed valid, the retrieval component 140 determines a cache-hit and decompresses the cache line. The cache line may then be forwarded to the load-store unit (LSU) of the processor and placed into L2 cache. When the cache tag or validation value are not deemed valid, the retrieval component 140 determines a cache-miss. The retrieval component 140 may then read the cache line from the SCM or backing memory. The retrieval component 140 may forward the cache line to the LSU and the cache line data may be placed into L2 cache.

Figure 3:
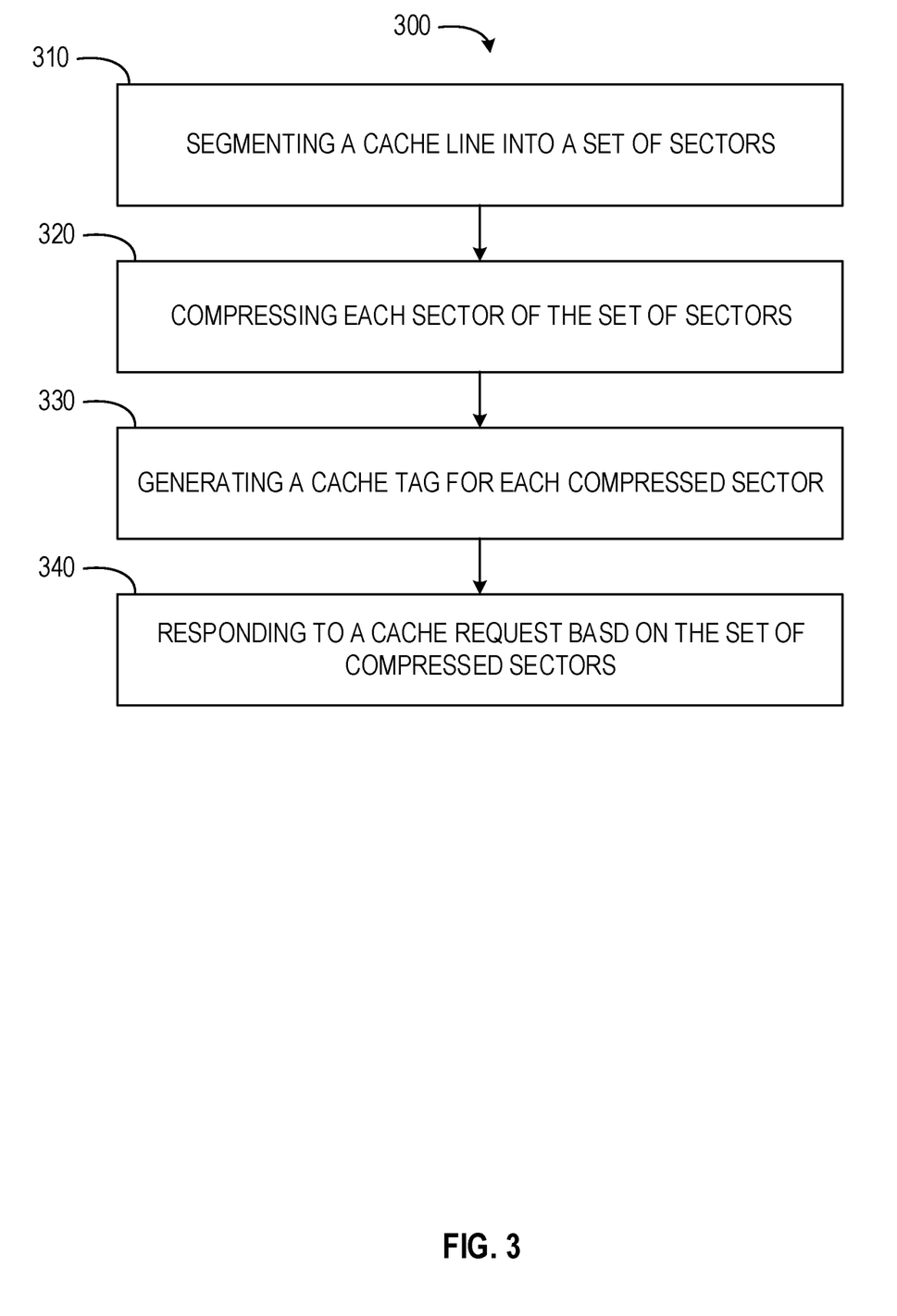
FIG. 3 depicts a flow diagram of a computer-implemented method for local DRAM caching of storage class memory elements, according to at least one embodiment.

FIG. 3 shows a flow diagram of an embodiment of a computer-implemented method 300 for local DRAM caching of storage class memory elements. The method 300 may be performed by or within the computing environment 100. In some embodiments, the method 300 comprises or incorporates one or more operations of the method 200. In some instances, operations of the method 300 may be incorporated as part of or sub-operations of the method 200.

In operation 310, the line component 110 segments the cache line into a set of quadword sectors. In some embodiments, the cache line is a 128-byte cache line. The line component 110 may treat the cache line as four 32-byte quadword sized sectors, and segment the cache line to reflect the quadword sized sectors. In some instances, the line component 110 may segment the cache line into octword sectors using a Powerbus unit of data transfer. The octword sectors may include a critical octword.

In some embodiments, the set of quadword or octword sectors are positioned sequentially or contiguously in local DRAM. In some instances, the cache line, quadword sectors, or octword sectors may be mapped into the local DRAM cache from contiguous or non-contiguous positions in a remote memory, SCM, or backing memory. The remote addresses may be mapped to the cache address using any suitable operation. For example, the remote addresses may be mapped to the cache address as represented by: CacheAddr=RemoteAddr modulo CacheSize. Such instances may use a simple algebraic operation to map addresses in a manner similar to directly mapped cache arithmetic. Where the cache line, quadword, or octwords are non-contiguous or page-based, mapping tables may be used that translate linear or contiguous cache addresses to an actual cache address.

In operation 320, the compression component 120 compresses each quadword sector of the set of quadword sectors. Compression of the set of quadword sectors generates a set of compressed quadword sectors. In some embodiments, the compression component 120 lightly or trivially compresses each quadword sector of a cache line to make open or free space available. For example, each quadword sector may be compressed sufficiently to create open space of six bits. The compression component 120 may compress each quadword sector in a manner similar to or the same as described above with respect to operation 220. The compression component 120 may similarly compress each octword sector, where the cache line is segmented into octwords.

In operation 330, the tag component 130 generates a cache tag for each compressed quadword of the set of compressed quadword sectors. The cache tag may be a K-bit cache address tag. In some embodiments, the tag component 130 generates a validation value for each compressed quadword sector of the set of compressed quadword sectors. Where a validation value is to be generated, the cache tag may be a K-bit cache address tag plus a valid bit. For example, the cache tag may be generated as a six bit tag with a validation bit. The tag component 130 may similarly generate cache tags and validation values for each octword, where the cache line is segmented into octword sectors. The tag component 130 may generate the cache tag and the validation value for each compressed quadword in a manner similar to or the same as described above—with respect to operation 230 and 240, respectively.

In some embodiments, operations 310, 320, and 330 comprise a cache write operation. The cache write operation may compress each sector and write the tag and validation value in the free or open space created by compressing the respective quadword sectors. Where one or more sectors cannot be compressed, the cache write operation writes a validation value of zero in the free or open space and writes the sectors of the cache line to the next level memory, such as the SCM, instead of the DRAM cache.

In operation 340, the retrieval component 140 responds to a cache request based on the set of compressed quadword sectors. In some embodiments, the set of compressed quadwords includes a critical quadword. In such instances, the retrieval component 140 responds to the cache request by determining a cache-hit or cache-miss based on the critical quadword of the set of compressed quadword sectors. The cache-hit may occur where an address and a tag are matched for a quadword, such as the critical quadword. Further, the cache-hit may occur where the address and the tag are matched, and where the status is determined to be valid, based on the validation value. Where the address and tag are not matched, or the quadword is determined not to be valid, the cache-miss occurs. Where the cache-miss occurs, the cache line may be read from next level memory, such as SCM. The retrieval component 140 may similarly respond to a cache request based on a critical octword. The critical quadword or critical octword may initially be provided to the retrieval component 140 and may be supplied by a microcontroller unit. In some instances, octword sectors of a cache line may be arbitrarily recorded within the DRAM cache.

In some embodiments, the cache read operation is performed on the critical quadword first. The critical quadword is read from the DRAM cache. If the validation value (e.g., the valid bit) equals one or is otherwise determined to be valid and the tag matches, the critical quadword is decompressed and delivered to the retrieval component 140. In some embodiments, the compression component 120 decompresses the critical quadword. The remaining quadwords in the cache line may then be subsequently or sequentially decompressed and the retrieval component 140 may retrieve each decompressed quadword. The cache read operation may be performed in a manner similar to or the same as described above with respect to operation 250.

In some instances, an address is generated for the first region from an address of the second region for each quadword sector. In response to a cache hit, the cache line may be read from the first region by decompressing a quadword sector of the set of quadword sectors associated with the cache hit and the quadword sector may be delivered to one or more processors. In some instances, an address is generated for the first region from an address of the second region. In response to a cache miss, the cache line may be read from the second region. The first region may be a local address space of a processor mapped to a DRAM cache and the second region may be a local address space of a processor mapped to a secondary memory, such as SCM or backing memory.

Figure 4:
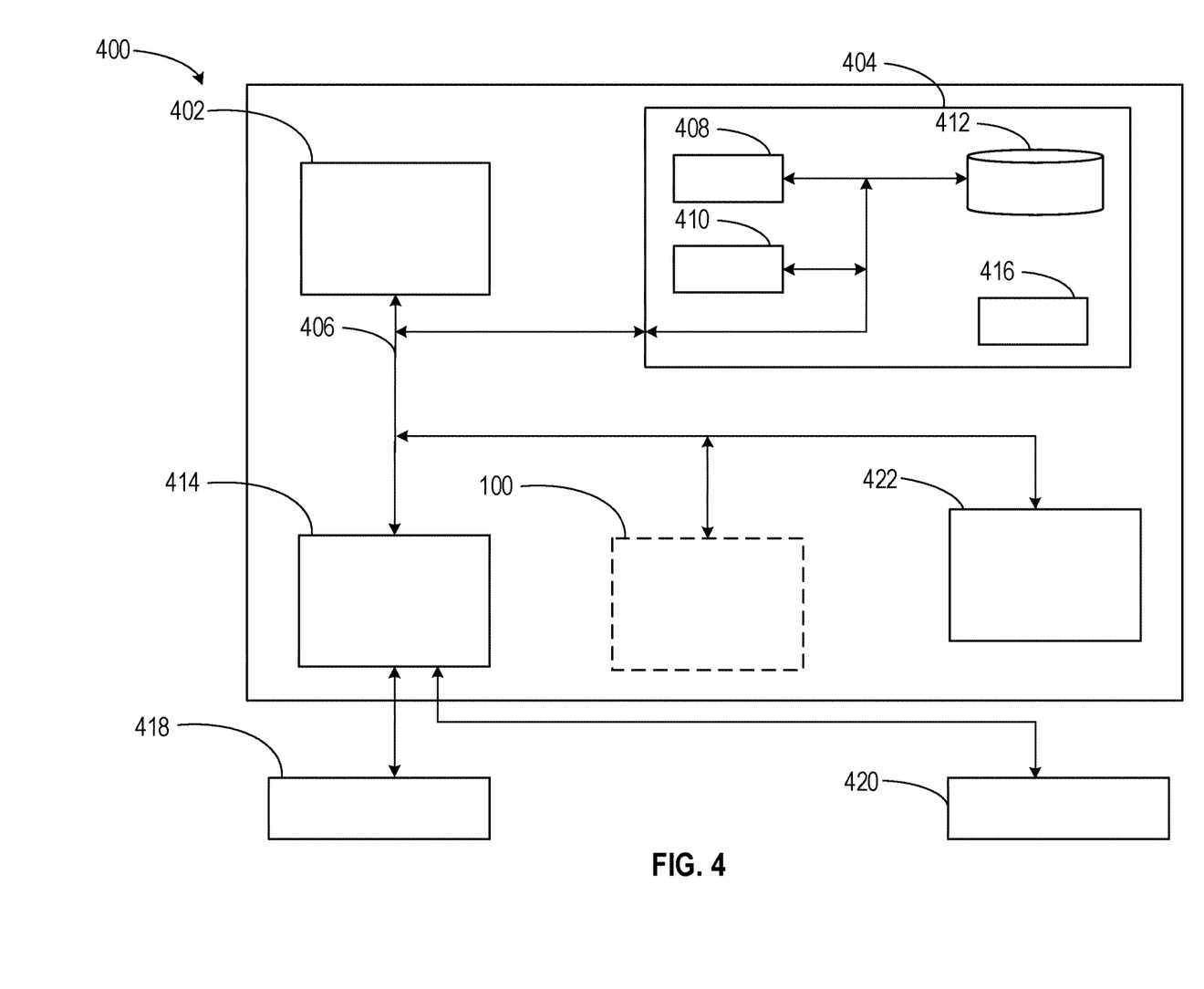
FIG. 4 depicts a block diagram of a computing system for local DRAM caching of storage class memory elements, according to at least one embodiment.

Embodiments of the present disclosure may be implemented together with virtually any type of computer, regardless of the platform is suitable for storing and/or executing program code. FIG. 4 shows, as an example, a computing system 400 (e.g., cloud computing system) suitable for executing program code related to the methods disclosed herein and for local DRAM caching of storage class memory elements.

The computing system 400 is only one example of a suitable computer system and is not intended to suggest any limitation as to the scope of use or functionality of embodiments of the present disclosure described herein, regardless, whether the computer system 400 is capable of being implemented and/or performing any of the functionality set forth hereinabove. In the computer system 400, there are components, which are operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, hand-held or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like. Computer system/server 400 may be described in the general context of computer system-executable instructions, such as program modules, being executed by a computer system 400. Generally, program modules may include routines, programs, objects, components, logic, data structures, and so on that perform particular tasks or implement particular abstract data types. Computer system/server 400 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 400 is shown in the form of a general-purpose computing device. The components of computer system/server 400 may include, but are not limited to, one or more processors 402 (e.g., processing units), a system memory 404 (e.g., a computer-readable storage medium coupled to the one or more processors), and a bus 406 that couple various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random-access memory (RAM) 408 and/or cache memory 410. Computer system/server 400 may further include other removable/non-removable, volatile/non-volatile computer system storage media. By way of example only, a storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, the system memory 404 may include at least one program product having a set (e.g., at least one) of program modules that are configured to carry out the functions of embodiments of the present disclosure.

The program/utility, having a set (at least one) of program modules 416, may be stored in the system memory 404 by way of example, and not limiting, as well as an operating system, one or more application programs, other program modules, and program data. Program modules may include one or more of the line component 110, the compression component 120, the tag component 130, and the retrieval component 140, which are illustrated in FIG. 1. Each of the operating systems, one or more application programs, other program modules, and program data or some combination thereof, may include an implementation of a networking environment. Program modules 416 generally carry out the functions and/or methodologies of embodiments of the present disclosure, as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such communication can occur via Input/Output (I/O) interfaces 414. Still yet, computer system/server 400 may communicate with one or more networks such as a local area network (LAN), a general wide area network (WAN), and/or a public network (e.g., the Internet) via network adapter 422. As depicted, network adapter 422 may communicate with the other components of computer system/server 400 via bus 406. It should be understood that, although not shown, other hardware and/or software components could be used in conjunction with computer system/server 400. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 5:
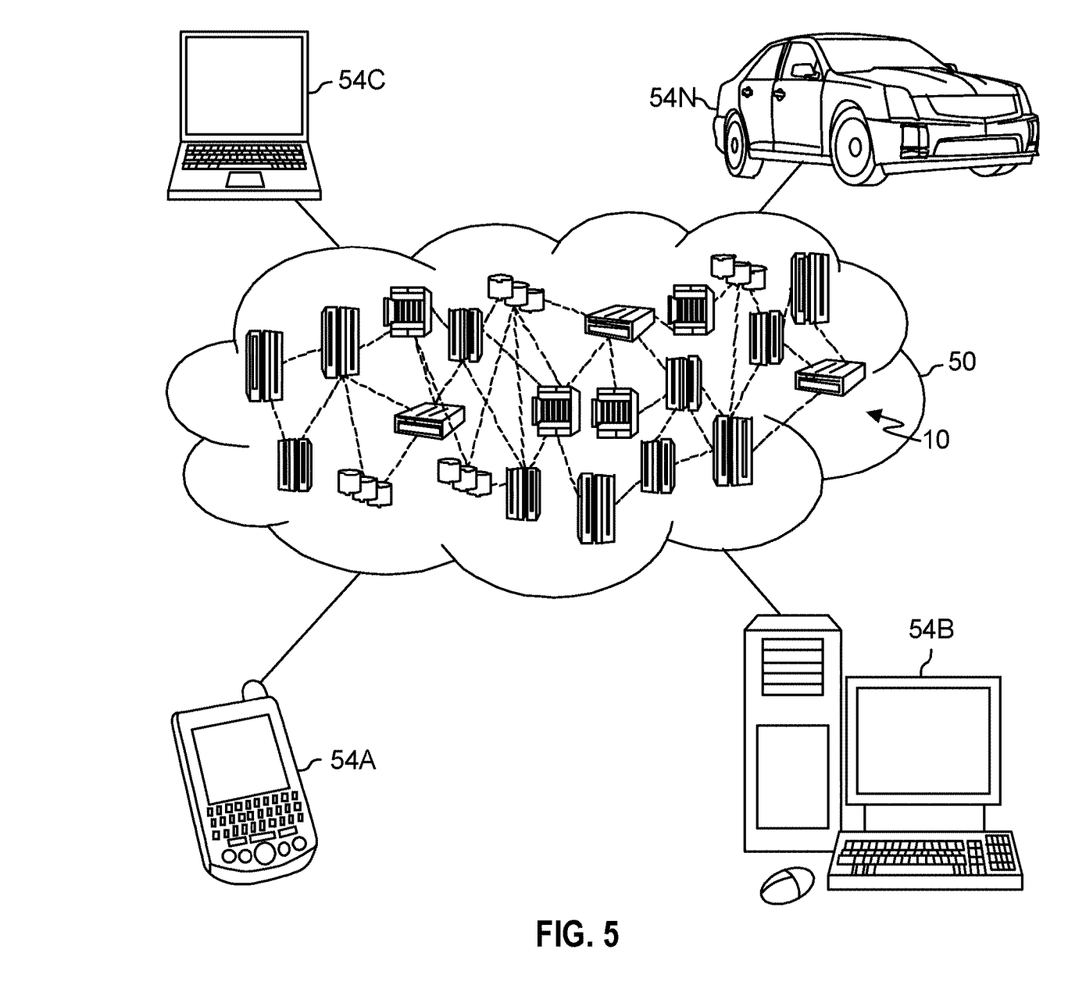
FIG. 5 is a schematic diagram of a cloud computing environment in which concepts of the present disclosure may be implemented, in accordance with an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
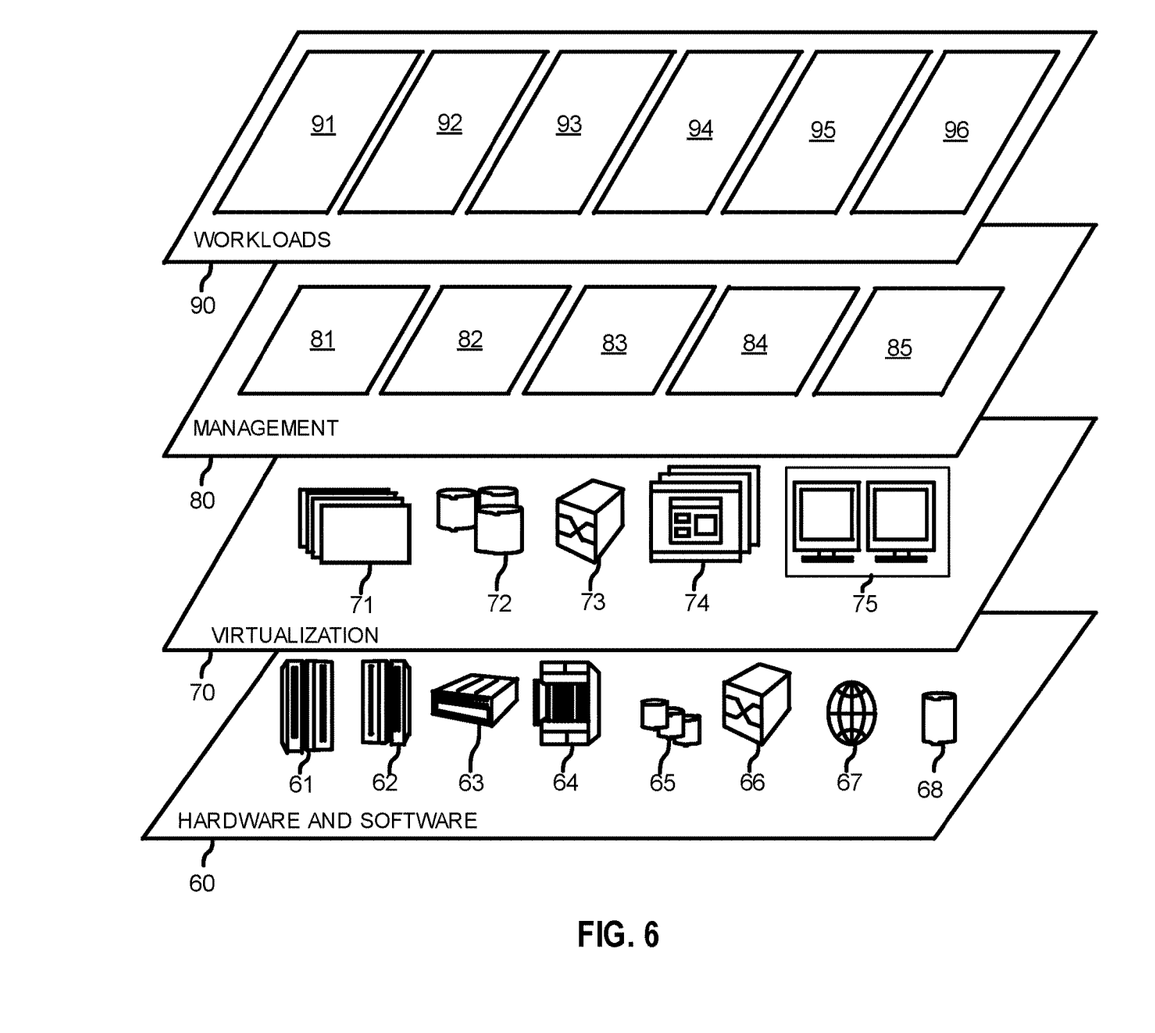
FIG. 6 is a diagram of model layers of a cloud computing environment in which concepts of the present disclosure may be implemented, in accordance with an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cache processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   identifying a cache line with a cache address in a dynamic random-access memory (DRAM) cache, the DRAM cache being a first memory type in a computing environment including a second memory type distinct from the first memory type;
   segmenting the cache line into a set of quadword sectors;
   compressing each quadword sector of the set of quadword sectors to generate a set of compressed quadword sectors and an open memory space within the DRAM cache;
   generating a cache tag and a validation value in the open memory space for each compressed quadword sector of the set of quadword sectors;
   determining a presence of the cache line based on the cache address, the cache tags, and the validation values; and in response to a cache-hit, delivering at least a decompressed portion of the cache line in response to the cache-hit.

2. The method of claim 1, wherein the open memory space is contiguous with the compressed cache line within the DRAM cache.

3. The method of claim 1, wherein a local address space of a processor is divided into a first region and a second region, the first memory type being mapped to the first region and the second memory type being mapped to the second region, the method further comprising:
generating an address for the first region from an address of the second region; and
in response to a cache-hit, reading the cache line from the first region by decompressing a quadword sector of the set of quadword sectors associated with the cache-hit and delivering the quadword sector.

4. The method of claim 1, wherein a local address space of a processor is divided into a first region and a second region, the first memory type being mapped to the first region and the second memory type being mapped to the second region, the method further comprising:
generating an address for the first region from an address of the second region; and
in response to a cache-miss, reading the cache line from the second region.

5. The method of claim 1, wherein a local address space of a processor is divided into a first region and a second region, the first memory type being mapped to the first region and the second memory type being mapped to the second region, and the cache line is a set of cache lines within the DRAM cache, the method further comprising:
determining a first subset of cache lines to be compressible;
compressing each cache line of the first subset of cache lines within the DRAM cache to generate a set of compressed cache lines and a set of open memory spaces;
generating a distinct cache tag for each compressed cache line of the set of compressed cache lines;
generating a first validation value for each compressed cache line of the set of compressed cache lines; and
storing each compressed distinct cache line, cache tag, and first validation value in the first region.

6. The method of claim 1, wherein a local address space of a processor is divided into a first region and a second region, the first memory type being mapped to the first region and the second memory type being mapped to the second region, and the cache line is a set of cache lines within the DRAM cache, the method further comprising:
determining a second subset of cache lines to be uncompressible;
storing the second subset of cache lines in a backing memory in the second region; and
generating a second validation value for each cache line of the second subset of cache lines within the DRAM cache in the first region.

7. A system, comprising:
one or more processors; and
a computer-readable storage medium, coupled to the one or more processors, storing program instructions that, when executed by the one or more processors, cause the one or more processors to perform operations comprising:
identifying a cache line with a cache address in a dynamic random-access memory (DRAM) cache, the DRAM cache being a first memory type in a computing environment including a second memory type distinct from the first memory type;
segmenting the cache line into a set of quadword sectors;
compressing each quadword sector of the set of quadword sectors to generate a set of compressed quadword sectors and an open memory space within the DRAM cache;
generating a cache tag and a validation value in the open memory space for each compressed quadword sector of the set of quadword sectors;
determining a presence of the cache line based on the cache address, the cache tags, and the validation values; and
in response to a cache-hit, delivering at least a decompressed portion of the cache line in response to the cache-hit.

8. The system of claim 7, wherein the open memory space is contiguous with the compressed cache line within the DRAM cache.

9. The system of claim 7, wherein a local address space of the one or more processors is divided into a first region and a second region, the first memory type being mapped to the first region and the second memory type being mapped to the second region, the operations further comprising:
generating an address for the first region from an address of the second region; and
in response to a cache-hit, reading the cache line from the first region by decompressing a quadword sector of the set of quadword sectors associated with the cache-hit and delivering the quadword sector.

10. The system of claim 7, wherein a local address space of the one or more processors is divided into a first region and a second region, the first memory type being mapped to the first region and the second memory type being mapped to the second region, the operations further comprising:
generating an address for the first region from an address of the second region; and
in response to a cache-miss, reading the cache line from the second region.

11. The system of claim 7, wherein a local address space of the one or more processors is divided into a first region and a second region, the first memory type being mapped to the first region and the second memory type being mapped to the second region, and the cache line is a set of cache lines within the DRAM cache, the operations further comprising:
determining a first subset of cache lines to be compressible;
compressing each cache line of the first subset of cache lines within the DRAM cache to generate a set of compressed cache lines and a set of open memory spaces;
generating a distinct cache tag for each compressed cache line of the set of compressed cache lines;
generating a first validation value for each compressed cache line of the set of compressed cache lines; and
storing each compressed cache line, distinct cache tag, and first validation value in the first region.

12. The system of claim 7, wherein a local address space of the one or more processors is divided into a first region and a second region, the first memory type being mapped to the first region and the second memory type being mapped to the second region, and the cache line is a set of cache lines within the DRAM cache, the operations further comprising:
determining a second subset of cache lines to be uncompressible;

storing the second subset of cache lines in a backing memory in the second region; and generating a second validation value for each cache line of the second subset of cache lines within the DRAM cache in the first region.

13. A computer program product comprising a computer readable storage medium having program instructions embodied therewith, the program instructions being executable by one or more processors to cause the one or more processors to perform operations comprising:

identifying a cache line with a cache address in a dynamic random-access memory (DRAM) cache, the DRAM cache being a first memory type in a computing environment including a second memory type distinct from the first memory type;

segmenting the cache line into a set of quadword sectors;

compressing each quadword sector of the set of quadword sectors to generate a set of compressed quadword sectors and an open memory space within the DRAM cache;

generating a cache tag and a validation value in the open memory space for each compressed quadword sector of the set of quadword sectors;

determining a presence of the cache line based on the cache address, the cache tags, and the validation values; and in response to a cache-hit, delivering at least a decompressed portion of the cache line in response to the cache-hit.

14. The computer program product of claim 13, wherein a local address space of the one or more processors is divided into a first region and a second region, the first memory type being mapped to the first region and the second memory type being mapped to the second region, the operations further comprises:

generating an address for the first region from an address of the second region; and in response to a cache-hit, reading the cache line from the first region by decompressing a quadword sector of the set of quadword sectors associated with the cache-hit and delivering the quadword sector.

15. The computer program product of claim 13, wherein a local address space of the one or more processors is divided into a first region and a second region, the first memory type being mapped to the first region and the second memory type being mapped to the second region, the operations further comprising:

generating an address for the first region from an address of the second region; and in response to a cache-miss, reading the cache line from the second region.

16. The computer program product of claim 13, wherein a local address space of the one or more processors is divided into a first region and a second region, the first memory type being mapped to the first region and the second memory type being mapped to the second region, and the cache line is a set of cache lines within the DRAM cache, the operations further comprising:

determining a first subset of cache lines to be compressible;

compressing each cache line of the first subset of cache lines within the DRAM cache to generate a set of compressed cache lines and a set of open memory spaces;

generating a distinct cache tag for each compressed cache line of the set of compressed cache lines;

generating a first validation value for each compressed cache line of the set of compressed cache lines; and storing each compressed distinct cache line, cache tag, and first validation value in the first region.

17. The computer program product of claim 13, wherein a local address space of the one or more processors is divided into a first region and a second region, the first memory type being mapped to the first region and the second memory type being mapped to the second region, and the cache line is a set of cache lines within the DRAM cache, the operations further comprising:

determining a second subset of cache lines to be uncompressible;

storing the second subset of cache lines in a backing memory in the second region; and generating a second validation value for each cache line of the second subset of cache lines within the DRAM cache in the first region.

* * * * *